July 8, 1924.
J. Q. SHERMAN ET AL
1,500,727
FLAT BED MANIFOLDING TYPEWRITER
Filed Sept. 21, 1920
7 Sheets-Sheet 3
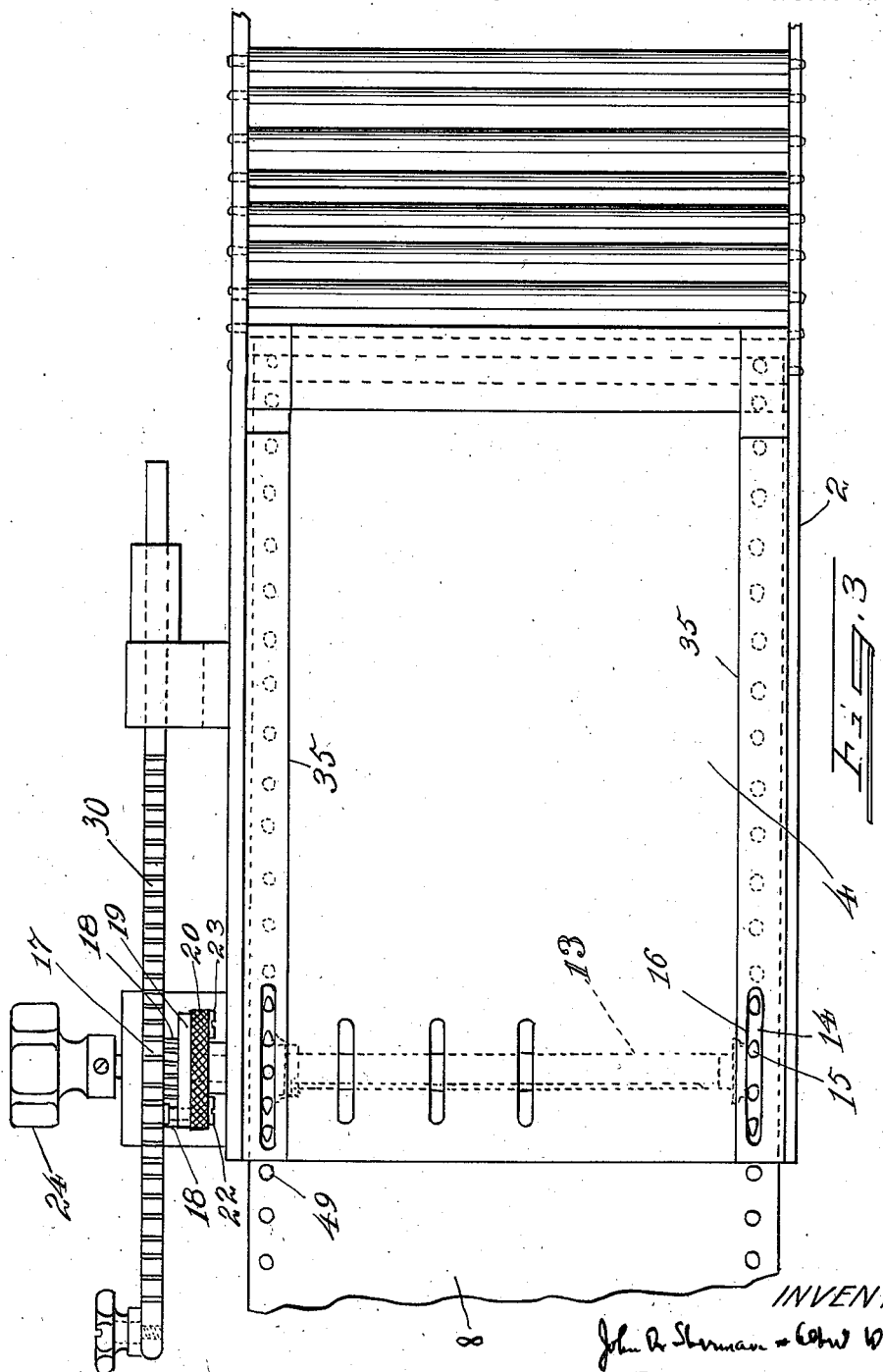

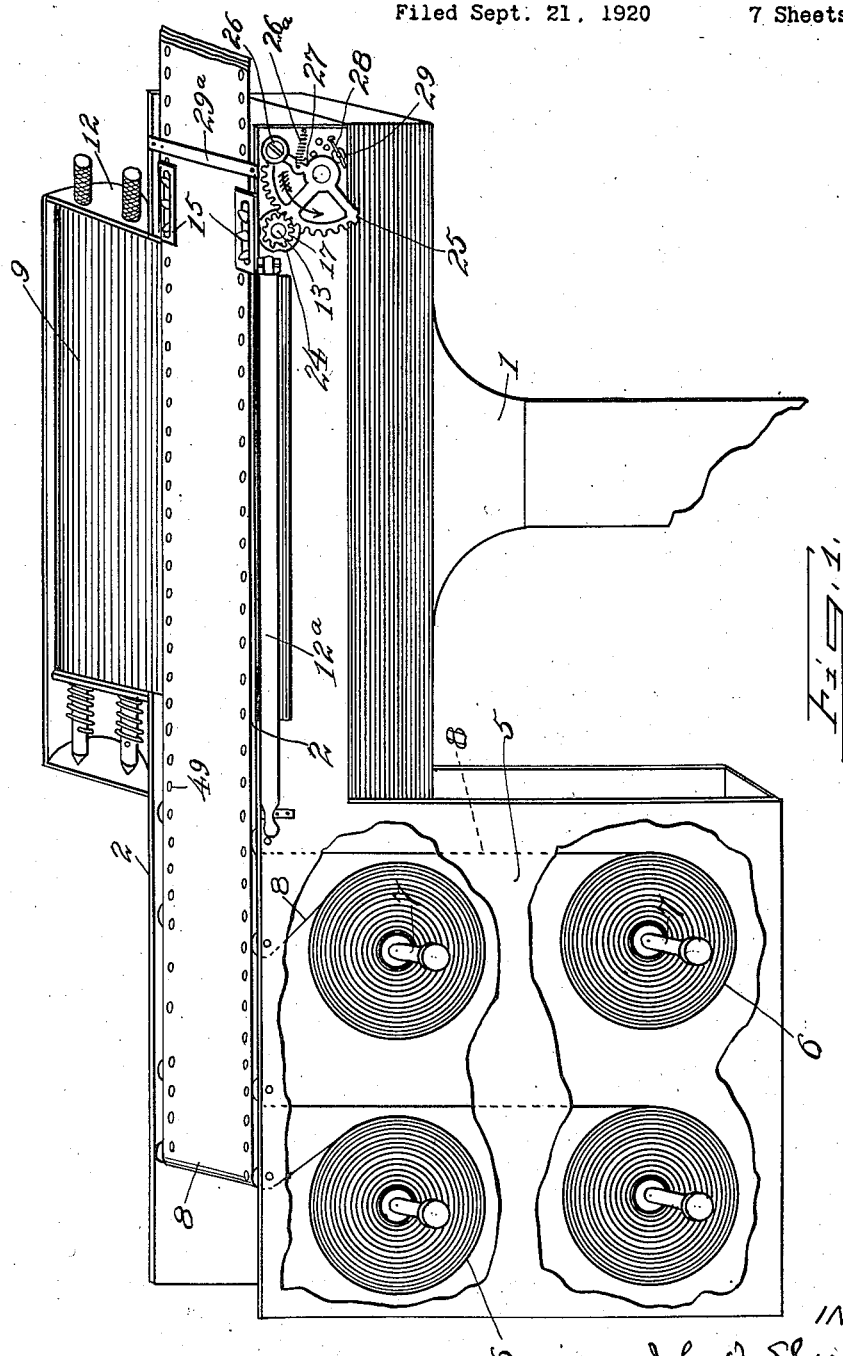

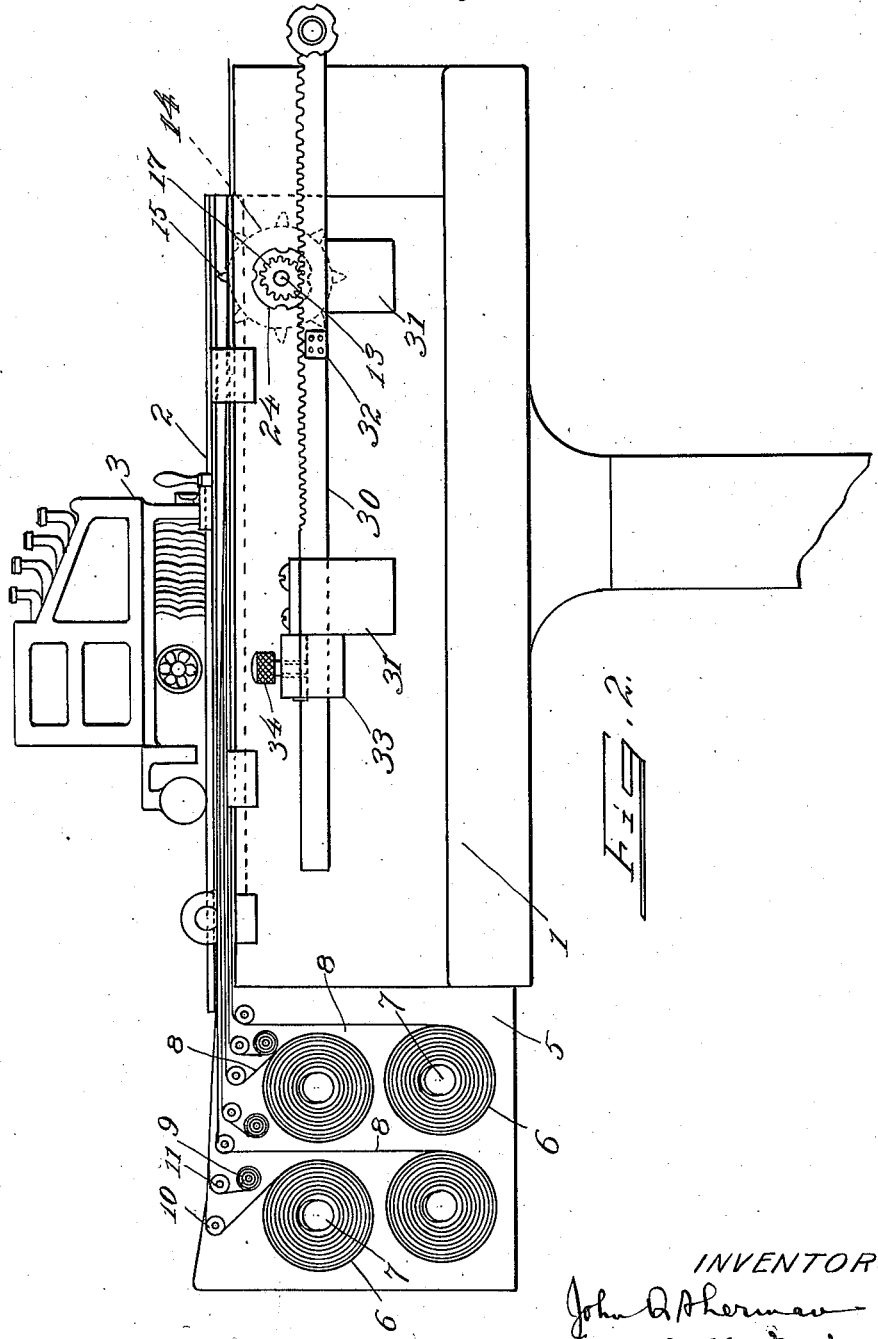

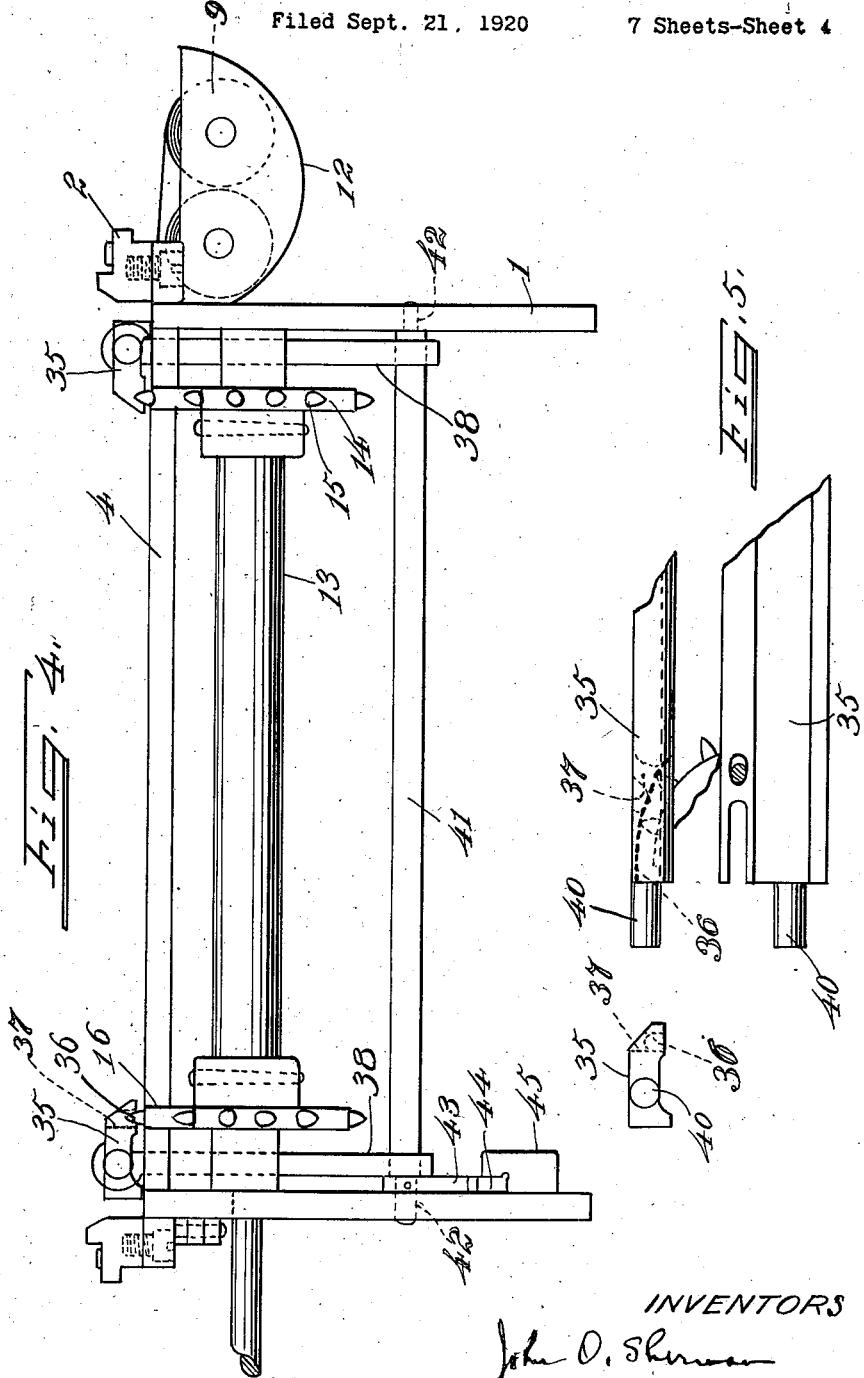

July 8, 1924.
J. Q. SHERMAN ET AL
1,500,727
FLAT BED MANIFOLDING TYPEWRITER
Filed Sept. 21, 1920   7 Sheets-Sheet 5
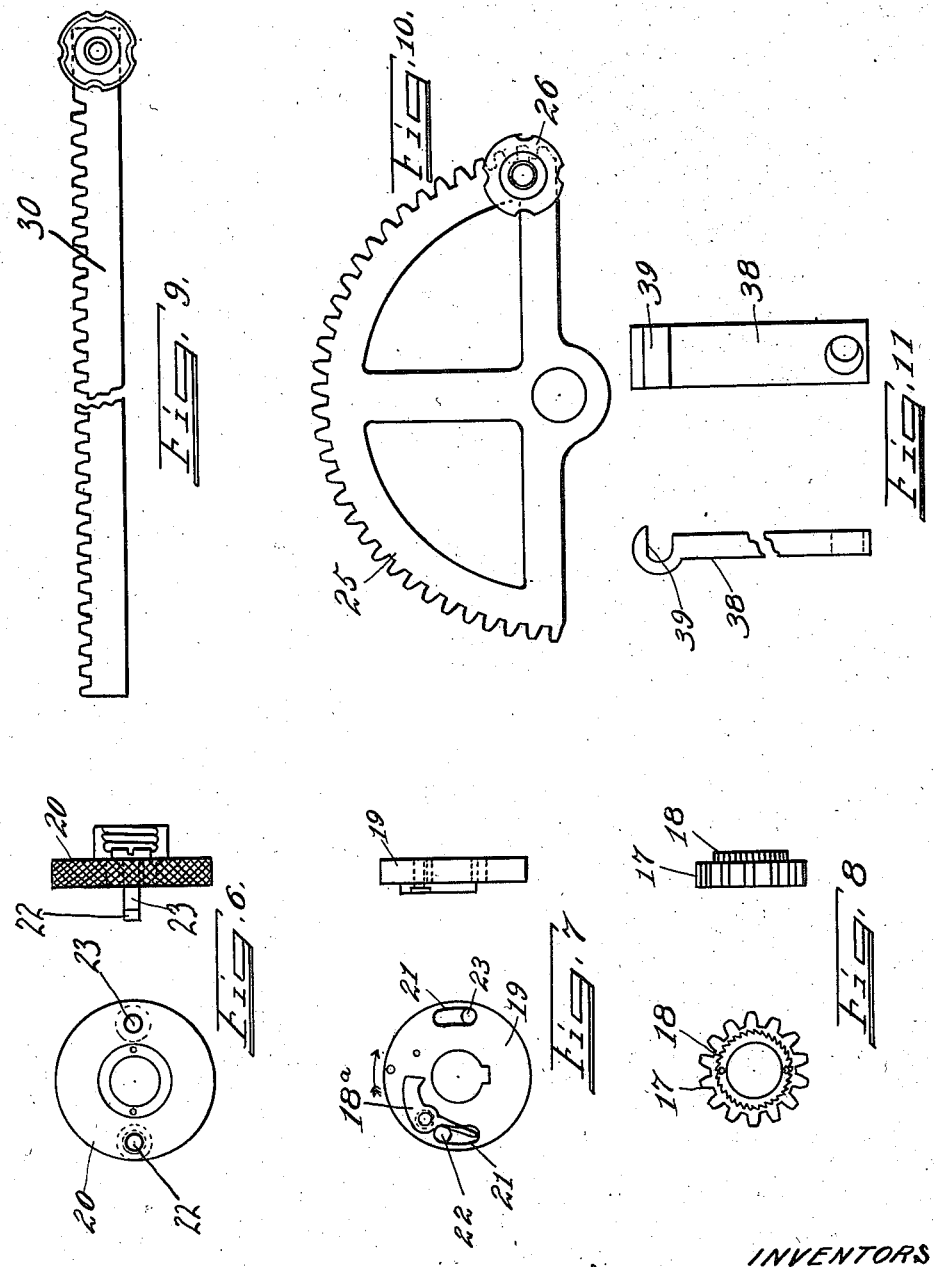

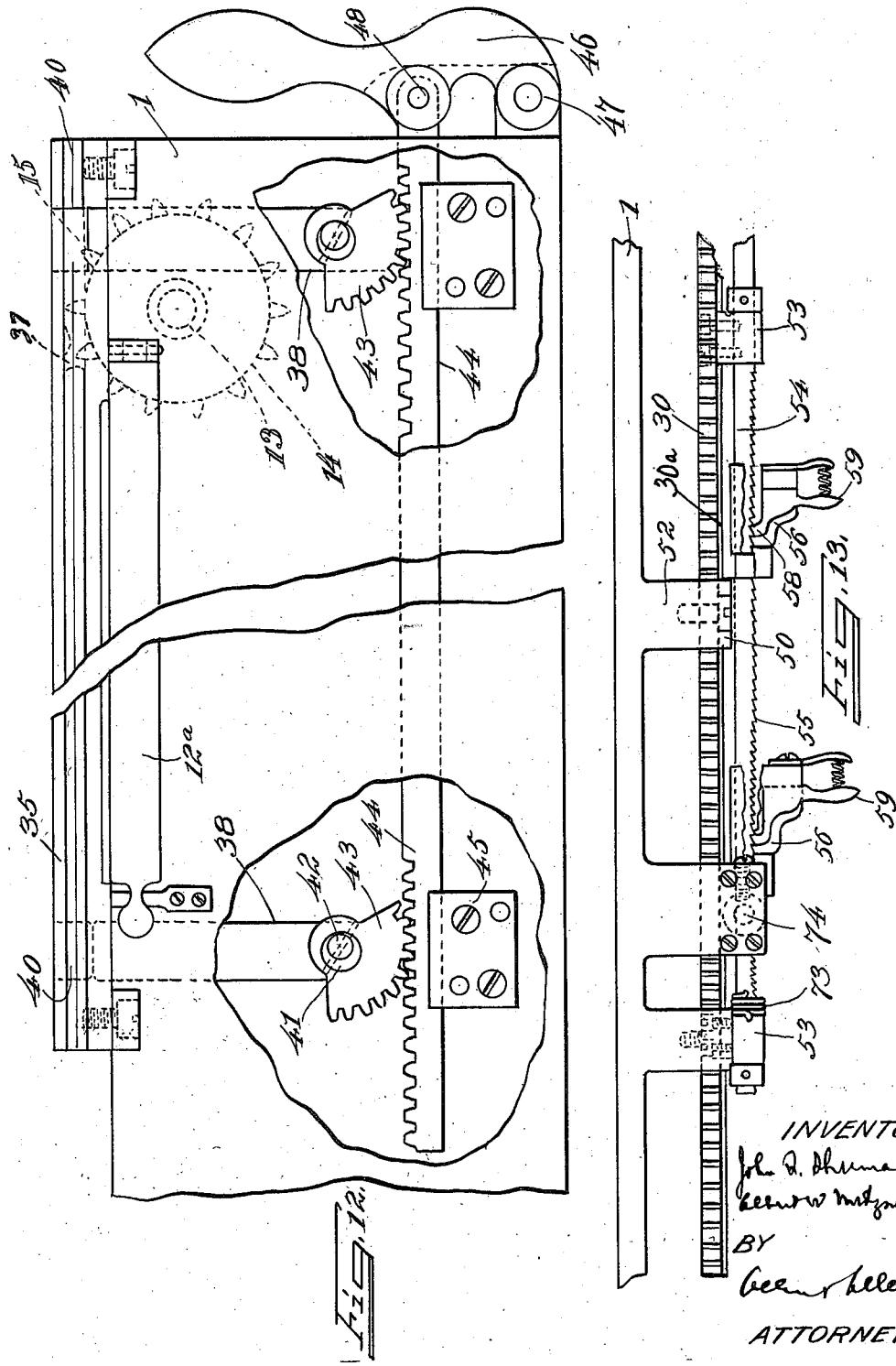

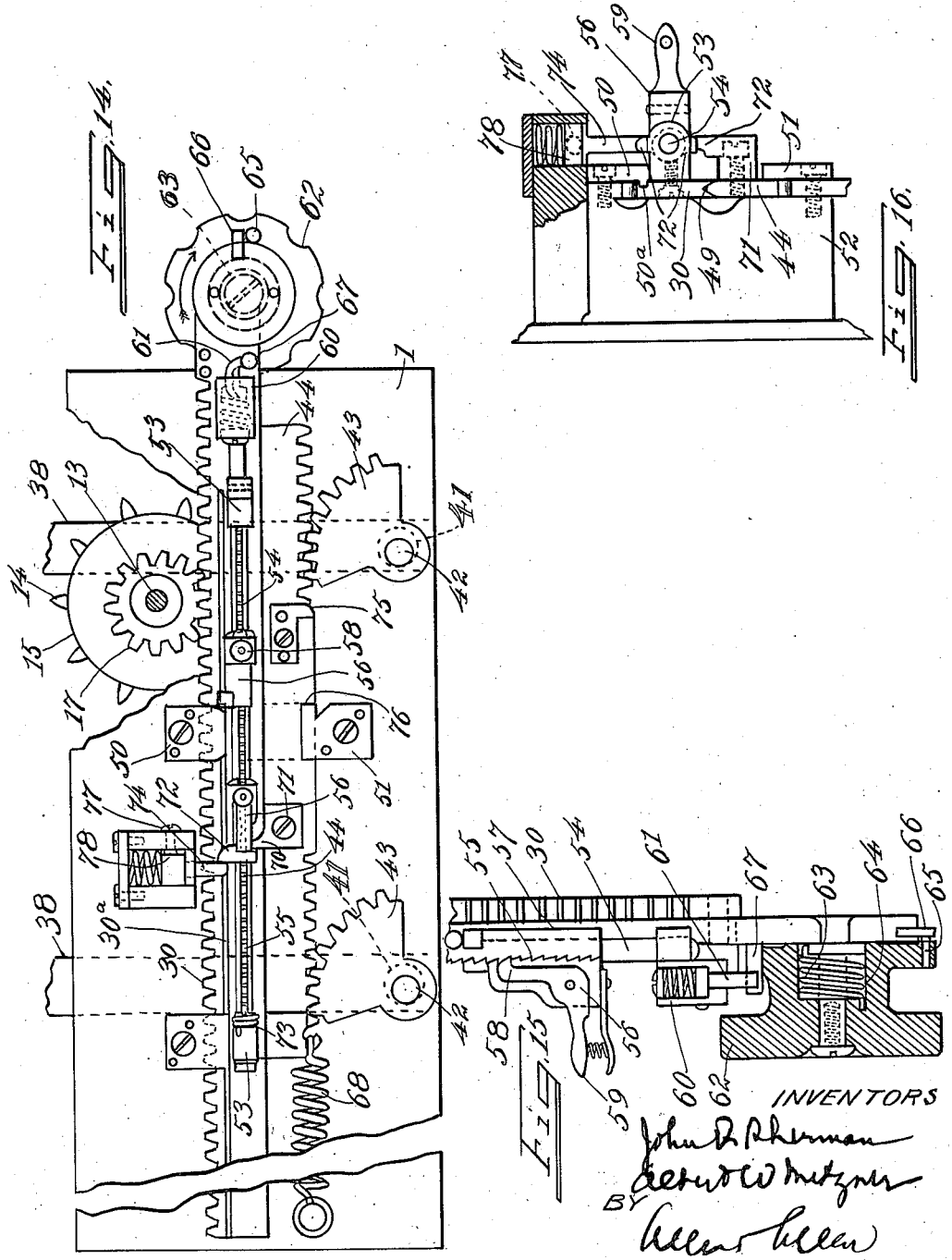

Patented July 8, 1924.

1,500,727

UNITED STATES PATENT OFFICE.

JOHN Q. SHERMAN AND ALBERT W. METZNER, OF DAYTON, OHIO; SAID METZNER ASSIGNOR TO SAID SHERMAN.

FLAT-BED MANIFOLDING TYPEWRITER.

Application filed September 21, 1920. Serial No. 411,783.

*To all whom it may concern:*

Be it known that we, JOHN Q. SHERMAN and ALBERT W. METZNER, citizens of the United States, and residents of Dayton, in the county of Montgomery and State of Ohio, have invented certain new and useful Improvements in Flat-Bed Manifolding Typewriters, of which the following is a full, clear, and exact description, reference being had to the drawings forming a part of this specification.

Our invention relates to flat bed typewriting machines wherein the typewriter itself moves over a flat platen or bed, while the paper remains on the bed during the writing, after which the portion written on is removed and a fresh section of paper exposed. The paper is stored in the desired number of continuous webs, and is fed forward from the webs to proper position on the bed.

In machines of this character it is our object to provide means for feeding the paper and simultaneously keep it in alignment, while retaining it in proper condition for writing thereon with the typewriter. This involves according to our invention the use of webs of paper which have successive holes punched therein, said holes being employed for the feeding of the paper, and the alignment of it as well.

In accomplishing the alignment, we have provided means for insuring a loose condition of the paper during the feed, and also a means for clamping it to the bed when being written upon. We have provided means for feeding the paper in the desired length sections, and for a free manual movement of the paper independent of the normal measured feed, and in various other respects as will be made clear below, we provide for the proper handling of the paper throughout, together with automatic mechanism co-operating with the feed, and insuring this proper handling of the paper.

The most advantageous use of the machine of our invention is in relation to printed forms, made in plural copies on the various webs of paper, and the feeding and alignment holes punched in exactly similar relation to the printing in each of the forms on each web. The webs are printed up and punched in wide strips which are later slit, and thus the slitting, if inaccurate will not affect the proper relation of the holes in the paper, and furthermore the stretching of one side of the paper more than the others while it may affect the length of the forms and webs to a marked degree, will not except in a limited manner change the relation of the holes to the printed matter. By feeding the paper by means of rotary pin bearing bodies in a loose and hence adjustable condition, we provide for the constant alignment of the forms, through engagement and jogging imparted to the walls of the holes in the paper by the pins.

We accomplish our various objects and advantages by that certain construction and arrangement of parts to be hereinafter more specifically pointed out and claimed.

In the drawings,

Figure 1 is a perspective view of a simple form of machine showing our pin wheel feed.

Figure 2 is a side elevation of a machine showing a rack bar drive for the pin wheels, and a different method of interleaving carbon paper between the webs to be printed upon.

Figure 3 is a top plan view of the parts shown in Figure 2.

Figure 4 is a front elevational detail, showing the paper clamping devices.

Figure 5 is a view of three projections of the clamping bar.

Figure 6 is a plan and elevation of the screw carrying washer used in the pin wheel drive.

Figure 7 is a like view showing the pawl carrying keyed washer of the pin wheel drive.

Figure 8 is a like view of the loose gear and ratchet of the pin wheel drive.

Figure 9 is a side elevation of the simple rack form of drive.

Figure 10 is a like view of the segment for the drive, a modified use over the rack bar.

Figure 11 is a front and side elevational detail of the connecting rod for the paper clamp device.

Figure 12 is a side elevation of a manually operated device for clamping the paper.

Figure 13 is a top plan detail of an automatic device for operating the paper clamps.

Figure 14 is a side elevation of the said automatic device.

Figure 15 is a detail plan view of said automatic device, showing the operating handle in section.

Figure 16 is an end view of the same parts taken from the opposite end from the operating handle.

There are several modifications shown in the drawings, one of which is a segment operated manifolder, one a rack operated manifolder, a separable and independently operated paper clamp to work with either of the simple forms, and finally a combination of the clamping device and the rack operated device, wherein springs are employed to effect an automatic operation of the clamping device.

The pin wheel shaft and the ratchet and washers thereon are alike throughout, the clamping devices per se, independent of the means for operating them are alike, and the general type of machine is the same.

Thus there is the machine frame 1 having tracks 2 on which rides the typewriter 3. It is understood that the typewriter, as in the standard types of manifolding typewriters on flat bed frames, moves crosswise of the bed, and lengthwise, this forming no part of our invention per se.

The bed plate 4 of the machine is flat and of the desired area, and the frame terminates at the rear in a paper carrying or storage frame 5. Rolls 6 of paper are carried in this frame, there being spindles 7 set therein in a staggered relation to the vertical so that the webs of paper 8, when drawn off the rolls, will not frictionally rub against each other or so act as to bind, one against the other.

The carbon paper may be mounted on small rolls 9 set in between the paths of the paper webs as they are brought up from the rolls. In such a case, the rolls 9 hold tight by some suitable friction. The paper webs are passed over idler rollers 10 set in a line out of the horizontal, and the carbon paper passed over interspaced idler rollers 11, between the rollers 10 (Figure 2.)

The effect of this arrangement is that the carbon paper passes between the webs of writing paper, and extends forward to the writing point on the bed. Being out of vertical alignment and out of horizontal alignment, the carbon paper and writing paper do not bind at any point. The carbon paper will not be wide enough to interfere with the feed of the paper over the pins, and can be renewed by applying pressure to the paper as it is being fed, or releasing the rolls 9 during the feed, or in any other desired way.

According to another modification (Figure 1) the carbon paper rolls 9 are set in a box or trough 12 at one side of the machine bed, and the paper interleaved across the bed, and held at the other side by a clamping arm 12ᵃ of any desired type.

In each of the devices there is employed a shaft 13 mounted across the frame of the machine at the forward end of the bed, this shaft carrying thereon a pair of toothed wheels or pin wheels 14 having radial pins 15. If desired one or both of the pin wheels may be made adjustable lengthwise of the shaft to take care of narrow and wide paper in the same machine.

The two pin wheels lie within the side bars of the frame and are carefully aligned with each other. The plate 4 of suitable material to form the bed will preferably extend forward to a portion which is slotted, as at 16, to clear the pin wheels thereby acting as a stripper for the paper. There may be as many slots 16 as desired to take care of altered positions of the pin wheels or one of them, to accommodate smaller width pieces of paper, as has been noted. Furthermore the device may be employed with one pin wheel only without departure from the invention herein.

To operate the pin wheels the shaft is equipped with a pinion 17 which is to be driven, this pinion being loose on the shaft and carrying a ratchet 18. A keyed washer or collar 19, mounted on the shaft, carries a spring pawl 18ᵃ which engages the ratchet in one direction to drive the washer around upon rotation of the ratchet. An additional washer 20, having a knurled edge, is mounted loosely on the shaft and has two screws which engage in curved slots 21 in the pawl carrying washer. One of these screws 22 is longer than the other screw 23, and is positioned so that a twist of the knurled washer will cause this long screw to disengage the pawl from its normal position of mesh with the ratchet. When this is done the knob 24 mounted on the pin wheel shaft may be used to turn the pin wheels in either direction without affecting the devices for operating the drive pinion.

One method of driving the pin wheels will be by means of a toothed segment 25, mounted on the side of the frame, spring pulled at 26ᵃ and provided with an operating handle 26. A fixed stop 27 in the frame abuts the segment body when it has been pulled forwardly to the full extent (this being the idle movement of the segment). An adjustable stop pin 28 mounted in a fitting 29 serves as the stop at the end of the rearward and downward motion of the operating handle (the feeding movement of the device). This adjustment allows for different length feed for segment operations.

When a desired length bill has been fed forward by the pin wheels it may be torn off against any suitable blade 29a.

Another method of operation, and the one used in the automatic mechanism, to be described below, is a rack bar 30 mounted in guides 31 on the side frame of the device. This bar meshes with the pinion on the pin wheel shaft and is reciprocated by the operator. A fixed stop 32 mounted on the rack abuts the rearward guide plate upon rearward or driving movement and a stop 33, controlled in its position by a set screw 34, abuts said rearward guide plate upon forward or idle movement.

The independently operable paper clamp device, which except for the variation of being spring operated and automatically set, is the same for all of our modifications, comprises essentially two bars 35, 35, which lie along the margins of the bed plate of the machine. They are grooved out at the forward ends at 36, and at least for a short distance a hole 37 is bored through into the groove, for each bar. (Figures 4, 5 and 12.)

The grooves overlie the pin wheels when the bars are in raised position, but do not contact with them and act to loosely hold the paper down on the pins. When in clamping position the grooves permit the bars to come clear down against the platen or bed plate, and hold the assembled paper tightly in place during the writing. The grooves lie over the point where the pins come through the bed plate and the parts are set so that one of the pins on each feed wheel will extend through the holes into the groove, thereby forming a lock against movement, in either direction.

The bars are operated by connecting rods or bars 38, which extend downwardly from the bed, and have hooked ends 39 to engage the ends 40 of the clamp bars. At their lower ends the connecting bars are apertured to engage over an eccentric rod 41, said eccentric being formed with pins 42, journaled in the side frame of the device.

The pins 42 carry toothed segments 43 at their inner ends, said segments being in position to be engaged by a rack bar 44, mounted in guides 45 at the side of the frame. The rods 41 will extend across the machine from side to side, and be eccentrically mounted in duplicate on the pins so as to operate the connecting bars at both sides of each pin. There will also be preferably two of these cross rods or shafts, one for the front end and one at the rear end of the clamping bars, so that each clamping bar is operated at both ends.

The rack bar 44 and the segments need be on one side only of the machine, and when operated independently and manually, the rack bar will be connected to a suitable operating handle 46, pivoted to the frame at 47, and pivoted to the rack bar at 48. This handle may, however, be of any desired type.

We have, it will be observed, now described a mechanism whereby paper of a type punched with holes 49 so spaced as to correspond to the spacing of the feed pins, may be drawn off of the storage rolls in continuous webs, said webs of paper being free of friction during the feeding motion and held tight while being written upon. The insurance of this is that the pin wheels will not operate while the clamping bars are in place, and that the paper will under normal circumstances at once notify the operator by its looseness under the action of the type that the clamps are not in place, thereby causing the setting of them during the writing operation.

The paper is fed into position, in lengths which are predetermined by the pin movement and hole spacing in the paper, and the operator will then clamp the paper firmly in place along both margins without interfering with the operation of the typewriter device by lowering the clamping bars.

The operator may also adjust the feed of the paper by hand, upon operation of the knurled washer for tripping the operating pawl, and releasing the clamps should they be set.

In order to insure proper operation by automatic means, we have devised a composite arrangement of the two operating bars as shown in Figures 12–17.

The rack bar 30 in this form of mechanism is formed with a V-shaped groove 49, and the rack bar 44 is inverted from its position in the simpler form, and provided with a V-shaped upper edge to slide in the groove of the upper rack. The segments of the clamp device are also reversed in position to conform to the inverted rack.

To hold the two rack bars in place, plates 50 for the upper bar, and 51 for the lower bar are secured against the extensions 52 on the side frame of the machine. The upper plates 50 have ribs 50$^a$ engaging in a groove 30$^a$ in the bar 30.

Mounted on the pin wheel operating rack bar 30 are two bearings 53, which mount in a rotary manner a trip bar 54 which may be formed with rack teeth 55, for the ready adjustment of a pair of stop devices 56. These two stop devices have bodies 57 which slide over the toothed portion of the trip bar, and pawls 58, controlled by finger portions 59. Any desired form of adjustable or fixed stop could be employed in this instance, however, dependent upon the requirements of the machine.

A small fitting 60 on the forward end of the trip bar carries in a socket therein a spring plunger 61. The operating handle 62 for the feed pin rack bar 30 is in this instance pivoted thereon, and held normally by means of a coiled spring 63, set within a cored-out portion 64 thereof.

A pin 65 and a stop 66 on the rack bar control the normal position of the said handle. Another pin 67 on the handle serves to push the plunger 61 upwardly thereby revolving the trip bar on its journals.

The lower rack bar is controlled by a spring 68, and it will be remembered that unless the lower rack bar is in position to release the pin wheel feed, the upper rack bar cannot operate.

A stop 70 mounted at 71 on the lower rack bar serves to engage the special shaped end 72 on the adjustable stop 56 so that a rocking of the trip bar by the operating handle will release it for movement, and this movement will be accomplished by the spring on the lower rack bar.

The trip bar is brought back to normal position when it has been tripped to release the above noted stop by means of a coiled spring 73, connected to the bar and the rearward one of the journals.

The forward one of the stop devices 56 on the trip bar contacts with the spring plunger 74 mounted on one of the side frame extensions, and this acts as a limit to the movement of the upper rack in an inward direction, while a stop 75 on the lower rack bears against a part 76 of the plate 51 to form a fixed stop against the inward movement of the lower rack bar.

The upper rack bar is moved in and out by hand, and the trip bar stop end 72 is so formed that it engages behind the spring plunger 74, when the upper bar is in full outward position. To facilitate a latch action between the parts 72 and 74, the plunger has a beveled end, and is held against rotation by a screw 77, engaging a flattened portion 78 of the plunger that lies within its housing.

The sequence of operation of the device is then, as follows: The operator starting in the position with the operating knob drawn clear out until the stop 72 is behind the plunger or latch pin 74, and with the clamping devices in operating position and the trip bar in normal spring held position, will first turn the knob in a clockwise direction, which will release the clamp operating rack, causing it to snap away from its latched position through swinging the toothed segments, raise the clamps from the paper and the pin wheels. The continued turning of the knob releases the latch between the stop end 72 and the plunger 74, so that the whole upper bar, carrying with it the trip bar, can be thrust inwardly thereby feeding the paper a distance controlled by the position of the forward stop 56 on the trip bar.

The full inward movement having been made, the operator pulls the rack bar back again. The trip bar will have returned to its normal position so that the stop end 72 will pick up the stop on the lower rack bar, by latching action of the trip bar, whereby the end 72 will swing aside and snap over the lower rack bar stop when the upper rack bar is in its inward position.

A pulling forward of the operating knob will then bring both the upper and lower rack bars forward until the stop end 72 snaps behind the plunger 74, thereby holding the parts in position for writing, with the clamps down. Upon release of the operating knob it will move to normal position, snapping the pin thereon past the plunger on the trip bar ready for the next operation.

The above described mechanism for automatic operation of the two rack bars is merely a combination of parts which we have adopted, and shown as illustrative of a mechanical means for accomplishing our object which may have many changes of mere mechanical nature without departing from the spirit of our invention.

Any form of trip devices, latches, and stops would serve our purpose, one of the advantages of the structure shown over similar structures which will readily occur to those skilled in the art, is that the same operating knob may be used for both tripping and reciprocating the mechanism. The ready adjustability is another feature, since the length of the feed movement of the upper rack bar determines the amount of paper fed at any one time through the machine.

Having thus described our invention, what we claim as new and desire to secure by Letters Patent, is:—

1. In a manifolding typewriter, of the type having a flat bed and a movable typewriter mechanism, means for supplying webs of paper having successive holes punched therein, in a loose condition, and a rotary feed pin device adapted to readily and easily engage in said holes to feed the paper in alignment, and a clamping device for the paper adapted to enforce a tight condition thereof on the platen and means for releasing said clamping device during the operation of the feed pin device.

2. In a manifolding typewriter, of the type having a flat bed and a movable typewriter mechanism, means for supplying webs of paper having successive holes punched therein, in a loose condition, and a rotary feed pin device adapted to readily and easily engage in said holes to feed the paper in alignment, and a clamping device for the paper adapted to enforce a tight condition thereof on the platen and means on the clamping device adapted to hold the feed pin device out of operation except upon release of the said device.

3. In a manifolding typewriter, of the type having a flat bed and a movable typewriter mechanism, means for supplying webs of paper having successive holes punched therein, in a loose condition, and a rotary feed pin device adapted to readily and easily engage in said holes to feed the paper in alignment, and a clamping device to engage the paper against the bed of the machine along both margins thereof, to enforce a tight condition thereof during writing, said device being adapted to engage the feed pin device to prevent their motion when said clamping device is in clamping position.

4. In a manifolding typewriter, of the type having a flat bed and a movable typewriter mechanism, means for supplying webs of paper having successive holes punched therein, in a loose condition and a rotary feed pin device adapted to readily and easily engage in said holes to feed the paper in alignment, and a clamping device adapted to come down over the paper and hold it on the pin device non-frictionally when in elevated position, and to clamp the paper on the bed and lock the feed pins when in depressed position.

5. In a manifolding machine, means for supplying webs of paper having successive holes punched therein, in a loose condition and a rotary feed pin device adapted to readily and easily engage in said holes to feed the paper in alignment, said feed pin device having an operating means comprising in part intermeshing toothed members, a ratchet interposed between the toothed members and the feed pins, and means for releasing the ratchet for portions of a full movement of the toothed members.

6. In combination with a rotary pin feed device for paper, a shaft for said pin wheel device, a pinion loose on said shaft, means for driving the pinion, an operating handle on the shaft for movements independent of the pinion, a pawl and ratchet device comprising operative connection between the pinion and the shaft, and means for releasing the pawl of said device at will, for the purpose described.

7. In combination with a rotary pin wheel device, a shaft, a pinion loose on the shaft, means for driving the pinion, a ratchet secured to the pinion, a washer tight on the shaft and having a pawl meshing with the ratchet, and pawl tripping means slidable with relation to the washer, for releasing the pawl from the ratchet, for the purpose described.

8. In combination with a rotary pin wheel device, a shaft, a pinion loose on the shaft, means for driving the pinion, a ratchet secured to the pinion, a washer tight on the shaft and having a pawl meshing with the ratchet, and pawl tripping means slidable with relation to the washer, for releasing the pawl from the ratchet, said pawl tripping device comprising a post carrying member mounted adjacent the said washer, said washer having at least one slot therein and a post extending from the carrying member through said slot, said slot giving the post a pawl tripping motion.

9. A paper clamping device for use in a device of the character described comprising a bar extending lengthwise alongside of the bed of the device, connecting rods for said bar, eccentrics for operating said connecting rods to raise and lower the bar, and toothed means for rotating said eccentrics.

10. A paper clamping device for use in a device of the character described comprising a bar extending lengthwise alongside of the bed of the device, connecting rods for said bar, eccentrics for operating said connecting rods to raise and lower the bar, and toothed means for rotating said eccentrics, comprising toothed segments connected to said eccentrics, and a reciprocating rack bar in mesh with said toothed segments.

11. A paper clamping device for use with flat bed writing machines, comprising a pair of clamp bars extending along the sides of the bed, connecting rods for each end of each clamp bar, eccentrics for operating the connecting rods, said eccentrics for like ends of the bars being connected together, and a toothed means for operating the eccentrics.

12. A paper clamping device for use with flat bed writing machine, comprising a pair of clamp bars extending along the sides of the bed, connecting rods for each end of each clamp bar, eccentrics for operating the connecting rods, said eccentrics for like ends of the bars being connected together, and a toothed means for operating the eccentrics, comprising toothed segments on the eccentric connections, and a reciprocating rack bar in mesh with said segments.

13. A paper clamp for use in a device of the character described wherein a flat bed for paper is provided, said bed having a paper feed pin wheel projecting therethrough, said clamp comprising a flat portion lying horizontally of the bed of the machine, and a portion having an arched groove therein, to lie over a feeding pin wheel, and means for operating the clamp to preserve the arched groove out of contact with but overlying the pin wheel, when out of clamping position.

14. A paper clamp for use in a device of the character described wherein a flat bed for paper is provided, said bed having a paper feed pin wheel projecting therethrough, said clamp comprising a flat portion lying horizontally of the bed of the machine, and a portion having an arched groove therein, to lie over a feeding pin wheel, and means for operating the clamp to preserve the arched groove out of contact with but overlying the pin wheel, when out of clamping position, said grooved portions having a hole therethrough to engage over a pin of the pin wheel when the bar is in clamping position.

15. In a manifolding typewriter having a flat bed, pin wheel mechanism for feeding in alignment a plurality of webs of paper having successive holes therein, clamping means for engaging the paper over the flat bed, and means for enforcing release of the clamping means prior to operation of the feeding mechanism, and for enforcing operation of the clamping means at the close of the feeding operation.

16. In a manifolding typewriter having a flat bed, pin wheel mechanism for feeding in alignment a plurality of webs of paper having successive holes therein, clamping means for engaging the webs of paper against the bed and means for preventing operations of the feeding means until the clamping means is operated.

17. In a manifolding typewriter having a flat bed, pin wheel mechanism for feeding in alignment a plurality of webs of paper having successive holes therein, clamping means for engaging the webs of paper along both sides as it lies against the bed, thereby leaving a space between the clamping devices for the reception of printed impressions, and means for enforcing a release of the clamping means before the feeding mechanism can be operated.

18. In a manifolding typewriter having a flat bed, the combination of a paper feeding device comprising in part a rack bar, a paper clamping device comprising in part another rack bar, releasable means carried by the first rack bar for engaging and holding the second rack bar, said second rack bar being spring impelled into an operative motion when released from said engaging means, said rack bars being mounted to move in the same or paralled planes, for the purpose described.

19. In a device of the character described, the combination with the flat bed manifolding typewriter, of pin wheel mechanism for feeding paper in sections of the desired length over said bed, clamping means for retaining the paper against the bed when receiving written impressions, and rack bars for operation of said two mechanisms, said rack bars being adapted to reciprocatory movement, with the rack bar for the feeding mechanism having latch mechanism thereon, and the rack bar for the clamping mechanism having a spring for drawing it through its clamp effecting path, whereby the operation of the feed mechanism bar will cause the operation of the clamp device bar.

20. In a device of the character described a feed rack bar, and a clamp rack bar, said bars being mounted to slide with relation to each other, one of said bars being spring impelled in the operating direction of the other, and a latch on said other bar, said latch being controlled from the operating handle of the said other bar and adapted to set automatically, whereby it may be released prior to operation of said bar by manipulation of said handle.

21. In a device of the character described, the combination with a pin wheel feed mechanism and a clamping mechanism, an operating device for both mechanisms, means whereby one of the operating devices blocks movement of the other until released, and means whereby the said other operating device effects a setting movement of the first operating device, whereby sequence of operation of said two mechanisms is secured.

22. In a device of the character described, a feed rack bar and a clamp rack bar, said bars being mounted to operate in the same or parallel planes in reciprocatory paths, a spring to move the clamp rack bar in one direction, and a rocking bar carried by the feed rack bar, and having a latch device for picking up the clamp rack bar during one of the movements of the feed rack bar to move it in the other direction, and means for releasing said latch.

23. In a device of the character described, a feed rack bar and a clamp rack bar, said bars being mounted to operate in the same or parallel planes in reciprocatory paths, a spring to move the clamp rack bar in one direction, and a rocking bar carried by the feed rack bar, and having a latch device for picking up the clamp rack bar during one of the movements of the feed rack bar to move it in the other direction, and means for releasing said latch, said means comprising a rotary member and contacting means intermediate the rotary member and the rocking bar, said rotary member being also the operating handle for the feed rack bar.

24. In a device of the character described, a feed rack bar and a clamp rack bar, said bars being mounted to operate in the same or parallel planes in reciprocatory paths, a spring to move the clamp rack bar in one direction, and a rocking bar carried by the feed rack bar, and having a latch device for picking up the clamp rack bar during one of the movements of the feed rack bar to move it in the other direction, and means for releasing said latch, said means comprising a rotary member and contacting means intermediate the rotary member and the rocking bar, said rotary member being also the operating handle for the feed rack bar, said rocking bar and rotary member having spring means to return them to normal position with the contacting means in engagement.

25. In a device of the character described, the combination with a pin wheel feed mechanism and a clamping mechanism, an operating device for both mechanisms, means whereby one of the operating devices blocks movement of the other until released, and means whereby the said other operating device effects a setting movement of the first operating device, whereby sequence of operation of said two mechanisms is secured, and an adjustable stop device for the operating device for the pin wheel mechanism for controlling the length of movement thereof and hence of the feed mechanism.

26. In a device of the character described, a feed rack bar and a clamp rack bar, said bars being mounted to operate in the same or parallel planes in reciprocatory paths, a spring to move the clamp rack bar in one direction, and a rocking bar carried by the feed rack bar, and having a latch device for picking up clamp rack bar during one of the movements of the feed rack bar to move it in the other direction, and means for releasing said latch, said means comprising a rotary member and contacting means intermediate the rotary member and the rocking bar, said rotary member being also the operating handle for the feed rack bar, said rotary member having rack teeth thereon, and a stop in engagement with the desired teeth and hence adjustable along the said rotary member for limiting the movement thereof.

27. A paper clamp for use in a machine of the character described wherein a flat bed for paper is provided, said bed having a paper feed pin wheel projecting therethrough, said clamp comprising a flat portion lying horizontally of the bed of the machine along the side thereof, so as to confine the margin of paper held in the machine, and a portion having an arched groove therein adapted to lie over a feeding pin wheel.

28. In a manifolding typewriter of the type having a flat bed and a movable typewriter mechanism, means for supplying webs of paper having successive holes punched therein in a loose condition, and a rotary feed pin device adapted to readily and easily engage in said holes to feed the paper in alignment, and means for operating said rotary feed pin device comprising in part a spring controlled member adapted to operate said device in one direction of movement and automatically return to a normal spring held position without operation of said device, and a clamping device for the paper adapted to enforce a tight condition thereof on the platen and means for releasing said clamping device during the operation of the feed pin device.

JOHN Q. SHERMAN.
ALBERT W. METZNER.